(12) United States Patent
Dangur et al.

(10) Patent No.: US 12,663,341 B2
(45) Date of Patent: Jun. 23, 2026

(54) SYSTEM AND METHOD FOR AUTOMATIC INSPECTION OF VEHICLES

(71) Applicant: SPINFRAME TECHNOLOGIES LTD, Ramat Ishay (IL)

(72) Inventors: Ori Yakov Dangur, Timrat (IL); David Grun, Zihron Yako (IL); Avihu Meir Gamliel, Pardes-Hana (IL)

(73) Assignee: SPINFRAME TECHNOLOGIES LTD, Ramat Ishay (IL)

( * ) Notice: Subject to any disclaimer, the term of this patent is extended or adjusted under 35 U.S.C. 154(b) by 375 days.

(21) Appl. No.: 18/278,362

(22) PCT Filed: Feb. 24, 2022

(86) PCT No.: PCT/IL2022/050214
§ 371 (c)(1),
(2) Date: Aug. 22, 2023

(87) PCT Pub. No.: WO2022/180632
PCT Pub. Date: Sep. 1, 2022

(65) Prior Publication Data
US 2024/0133772 A1 Apr. 25, 2024
US 2024/0230473 A9 Jul. 11, 2024

Related U.S. Application Data

(60) Provisional application No. 63/153,644, filed on Feb. 25, 2021.

(51) Int. Cl.
*G01M 17/007* (2006.01)
*G01N 21/88* (2006.01)
(Continued)

(52) U.S. Cl.
CPC ...... *G01M 17/007* (2013.01); *G01N 21/8806* (2013.01); *G01N 21/8851* (2013.01);
(Continued)

(58) Field of Classification Search
CPC ............ G01M 17/007; G01N 21/8806; G01N 21/8851; G01N 35/00732;
(Continued)

(56) References Cited

U.S. PATENT DOCUMENTS 7,889,931 B2 2/2011 Webb
9,176,253 B2 11/2015 Khee
(Continued)

FOREIGN PATENT DOCUMENTS

WO WO-2006047266 A1 * 5/2006 ......... G01N 21/8806

OTHER PUBLICATIONS

Extended European Search Report dated Jan. 7, 2025 as received in Application No. 22759082.5.

*Primary Examiner* — Lori Lyjak
(74) *Attorney, Agent, or Firm* — Maschoff Brennan

(57) ABSTRACT

An automatic inspection station is presented for inspecting exterior of vehicles. The inspection station comprises a physical structure configured to be deployable at a predetermined location and, when deployed defining first and second adjacent compartments and exposing an inner space of the first compartment to vehicle's entry and exit into and from said inner space and at least partially isolate said inner space from ambient light. The first compartment comprises an inspection system, and the second compartment comprises a control system in data communication with the inspection system. The inspection system comprises an optical imaging system configured and operable for imaging a vehicle located within at least part of said inner space and generating image data which is processed and analyzed by the control system to generate data indicative of vehicle's status.

25 Claims, 7 Drawing Sheets

(51) Int. Cl.
    *G01N 35/00*     (2006.01)
    *G01N 35/04*     (2006.01)
(52) U.S. Cl.
    CPC . *G01N 35/00732* (2013.01); *G01N 35/00871* (2013.01); *G01N 2021/8816* (2013.01); *G01N 2021/8841* (2013.01); *G01N 2021/8887* (2013.01); *G01N 2035/00831* (2013.01); *G01N 2035/0494* (2013.01)
(58) Field of Classification Search
    CPC ..... G01N 35/00871; G01N 2021/8816; G01N 2021/8841; G01N 2021/8887; G01N 2035/00831; G01N 2035/0494; B60Q 10/06395; B60Q 10/08; B60Q 10/20; B60Q 50/04; B60Q 50/10; B60T 7/004; B60T 2207/30156; B60V 10/143; B60V 20/56; B60V 20/625
    See application file for complete search history.

(56) References Cited

U.S. PATENT DOCUMENTS

| | | | |
|---|---|---|---|
| 9,604,563 B1 * | 3/2017 | Wilson | G06Q 40/08 |
| 10,317,566 B2 | 6/2019 | Morton | |
| 2006/0114531 A1 | 6/2006 | Webb et al. | |
| 2006/0170768 A1 * | 8/2006 | Riley | H04N 7/181 |
| | | | 348/143 |
| 2017/0147990 A1 | 5/2017 | Franke | |
| 2018/0012350 A1 | 1/2018 | Gangitano et al. | |
| 2019/0174071 A1 | 6/2019 | Wasner | |
| 2020/0011808 A1 | 1/2020 | Ozim | |
| 2020/0242853 A1 | 7/2020 | Hagerty et al. | |

* cited by examiner

SYSTEM AND METHOD FOR AUTOMATIC INSPECTION OF VEHICLES

TECHNOLOGICAL FIELD AND BACKGROUND

The present invention is in the field of inspection techniques, in particular inspection of vehicles' surfaces/exterior, and relates to a vehicles' inspection station and method of its operation.

Vehicles, during their life cycle, have to undergo inspection procedures many times aimed at examining the vehicle's exterior for defects and damages associated with various events. For example, considering a damaged vehicle, in order to evaluate the damage, the vehicle may be taken to a repair station. Evaluating the damage that has occurred to a vehicle following an accident can be a time consuming and resource intensive process. Also, trading in a car or purchasing a used car typically requires the car inspection procedure. Further, evaluation of the quality of a finished vehicle, as well as that of intermediate vehicle assembling stages, in a vehicle manufacturing plant involved vehicle's exterior inspections. Typically, a vehicle undergoes many transportation and handling stages between manufacture and its final delivery to a customer. At each of the stages, the vehicle's status is to be assessed before responsibility is passed from one handler to another in order that any deterioration or damage is identified.

Various automatic inspection techniques have been developed for conducting security inspection of the contents/cargo within large vehicles and containers. Such inspection systems typically utilize X-ray systems which are accommodated in a location to which the vehicles and containers are brought for inspection. Mobile inspection systems have been developed which are mounted on a vehicle and can be assembled and deployed in various locations.

For example, U.S. Pat. No. 9,176,253 describes an X-ray or gamma ray radiation based inspection system for inspecting vehicles. This system is configured as a portable inspection system for placement in an inspection area and for inspection of vehicles passing through the inspection area, and includes a ramp arranged to pivot relative the surface between a stowed position and a deployed position in which the ramp extends away from the base for allowing a vehicle to pass over the ramp and the base through the inspection field.

GENERAL DESCRIPTION

There is a need in the art for a novel approach in vehicles' inspection enabling to bring the inspection station to and its deployment at vehicles' location region to perform effective inspection of the exterior of vehicles, being applied to stationary and/or moving vehicles.

The present invention provides for using a cargo container or canopy or tent or gate-like structure, or any other physical structure of the kind providing at least partial isolation of its inner space from ambient light and configuring such structure as a vehicle inspection station for automatic (or at least semi-automatic) optical inspection of the vehicle's exterior. Also, such a physical structure is preferably configured to enable it to be mobile and easily brought to and installed/deployed at the desired location.

In the description below such a structure is at times referred to and also exemplified in the figures as being configured as a cargo container, but it should be understood that the principles of the invention are not limited to this specific example and this term should be interpreted broadly covering also any one of the above listed configurations.

Also, in the description below the inspection station utilizing the above-described physical structure is at times referred to as a cargo inspection container. However, this terminology should not be confused with inspection of cargo inside a container or vehicle.

The cargo inspection container of the present invention can be used, by way of example, for inspecting a fleet of vehicles during a transportation stage, for identifying and assessing visible damage that may have occurred at any preceding stage. Such a cargo inspection container can be placed on a vehicle harbor, on a cargo ship, at car rental statins, cargo train platforms, car parks and the like. The cargo inspection container of the invention is preferably configured as a mobile station, but may also be a static/stationary station. The inspection station of the present invention can advantageously be used for car share, rental services, etc.

According to one broad aspect of the invention, it provides an automatic inspection station for automatic inspection of vehicle's exterior, the inspection station comprising a physical structure configured to be deployable at a predetermined location and, when deployed defining at least first and second adjacent compartments and exposing an inner space of the first compartment to vehicle's entry and exit into and from said inner space and at least partially isolating said inner space from ambient light, said first compartment comprising an inspection system, and said second compartment comprising a control system in data communication with the inspection system, said inspection system comprising an optical imaging system configured and operable for imaging a vehicle located within at least part of said inner space and generating image data, said control system being configured and operable to process the image data and generate data indicative of vehicle's status.

It should be noted that the physical structure (e.g. canopy, tent, container) may be configured to define more than one compartment configured as the inspection system, as well as more than one control systems. For example, the case may be such that the physical structure defines two first compartments, each configured as the independently operable inspection system, and one second compartment (control room) including first and second control systems in communication with the respective inspection systems in the first compartments or a common control system serving both inspection systems.

The physical structure defines the vehicle's entry and exit at one or at opposite sides of the inner space. Accordingly, the inspection station can operate to inspect vehicles in their static position within the inner space or moving vehicles (while driving through the inspection region within said inner space). Considering the physical structure defining the vehicle's entry and exit at opposite sides, respectively, of said inner space, such structure enables inspection of the vehicle while being stationary located within said inner space and enabling inspection of the vehicle while passing through said inner space.

Preferably, said physical structure is configured as a mobile structure.

As indicated above, the physical structure may be configured as a canopy or tent, or as a cargo container.

Considering the cargo container configuration of the physical structure of the inspection station, at least one facet of the cargo container, or each of the opposite facets thereof, is configured as a door, which when being shifted to its open position, exposes the inner space of the first compartment of the container to the vehicle's entry and exit.

In some embodiments, the inspection station also includes at least one ramp configured to be removably attached to respective at least one facet of the container to enable entry of the vehicle from road to said inner space at container level and exit of the vehicle from the inner space.

The imaging system comprises at least one light source configured to illuminate at least said part of the inner space, and two or more cameras defining two or more fields of view to collect illuminating light returned from said illuminated at least part of the inner space. The fields of view of at least some cameras may be partially overlapping.

In some embodiments, the imaging system comprises first and second imaging units comprising first and second cameras configured to collect illuminating light returned from first and second regions of the illuminated at least part of the inner space.

The camera(s) may be configured and operable with one or more of the following spectral characteristics: colored, monochrome, NIR, IR. Similarly, at least one of the light sources may be configured and operable with one or more of the following spectral characteristics: colored, monochrome, NIR, IR. Also, the light sources may be configured to produce coherent illumination.

In some embodiments, at least one of the light sources produces diffusive illumination.

In some embodiments, the illumination of the inner space may be such that at least one of the light sources directs light onto diffusive inner surfaces of the physical structure such that said at least part of the inner space is illuminated by light scattered from said diffusive inner surfaces.

In some embodiments, the at least one of the light sources is configured to illuminate said at least part of the inner space by structured light thereby enabling 3D imaging of an illuminated portion of the vehicle's exterior.

In some embodiments, the at least one of the light sources is configured and operable to project on said at least part of the inner space a predetermined pattern, thereby enabling to identify changes in topology of a portion of the vehicle's exterior being imaged.

In some embodiments, the inspection system further comprises at least one sensor configured and operable to detect vehicle's identification data provided on the vehicle entering said inner space, and communicate said identification data to the control system in association with the image data of said vehicle.

In some embodiments, the imaging system is configured and operable to detect vehicle's identification data provided on the vehicle being imaged and communicate said identification data to the control system in association with the image data of said vehicle.

The inspection system may further comprise one or more sensors configured and operable to provide sensing data indicative of the vehicle's position within said inner space. This sensing data may be used to enable activation of an inspection session upon identifying that the vehicle entering said inner space is in a registration position with respect to said optical imaging system. Such one or more sensors may comprise at least one proximity sensor and/or an optical system utilizing a physical or virtual target.

The inspection system may comprise a triggering system configured and operable to activate an inspection session by generating a triggering signal upon determining that at least a certain portion of the vehicle has arrived at a target location, defined by a physical or virtual target. The triggering system may comprise one or more from the following sensors: LIDAR, ultrasound proximity sensor, distance measuring sensor, laser cross line sensor, pressure sensor, sound microphone, microswitch. Alternatively or additionally, the triggering system may comprise a camera operable to provide video data enabling at least one of motion detection and object detection from said video data, thereby enabling said determining of a location of the at least certain portion of the vehicle.

In some embodiments, the control system is configured and operable for data communication with a cloud server.

The control system comprises a data processor and analyzer which may include a defect identifier configured and operable to process the image data and generate defect-related data being indicative of the vehicle's status. Also, the data processor and analyzer may further include a damage estimator utility configured and operable to analyze the defect-related data to estimate corresponding damage being indicative of the vehicle's status. In some embodiments, the control system is configured and operable to communicate the defect-related data to a cloud server to enable further analysis of the defect-related data to estimate corresponding damage being indicative of the vehicle's status.

In some embodiments, the control system is configured and operable to generate and store a report about the vehicle's status.

The control system may be configured and operable to process the image data by carrying out the following: identify in the image data various features of the vehicle, apply segmentation processing to image data corresponding to one or more of the features, and analyzing segmentation processing results by machine learning and, upon identifying a defect in the feature evaluating a corresponding damage, and generating the data indicative of the vehicle's status.

The control system may comprise an inspection controller configured and operable to operate the inspection system to implement one or more selected inspection modes during one or more inspection sessions, where the inspection mode(s) is/are selected in accordance with a specific vehicle to be inspected. In some embodiments, the inspection station includes a vehicle identifier configured and operable to identify the vehicle arriving to the inspection system and generating corresponding vehicle data to be assigned to the data indicative of the respective vehicle's status.

According to another broad aspect of the invention, it provides a method for automatic inspection of vehicles, the method comprising: providing, at a vehicle location, a physical structure in its deployed position defining a compartment having an inner space which is exposed to vehicle's entry and exit into and from said inner space and at least partially isolating said inner space from ambient light, and which is exposed to an inspection system mounted in said compartment; identifying the vehicle entering said inner space and generating vehicle relating data; upon identifying, by said inspection system that the vehicle is located in a registered position in said inner space, activating an imaging system of said inspection system to perform one or more imaging sessions on at least selected parts of said vehicle and generating image data indicative thereof; and processing and analyzing the image data to detect defects in vehicle's exterior, classify damage, and generate corresponding vehicle's statis data.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIGS. 2A-2C show an exemplary inspection station implemented within a cargo container that can be opened at its opposite sides, enables vehicle's inspection in either static position or while moving through the inner space of the container, wherein FIG. 1A illustrates of the perspective view of the inspection station; FIG. 1B illustrates a front view of the cargo container; and FIG. 1C illustrates a rear view of the cargo container;

DETAILED DESCRIPTION OF EMBODIMENTS

Figure 1A:
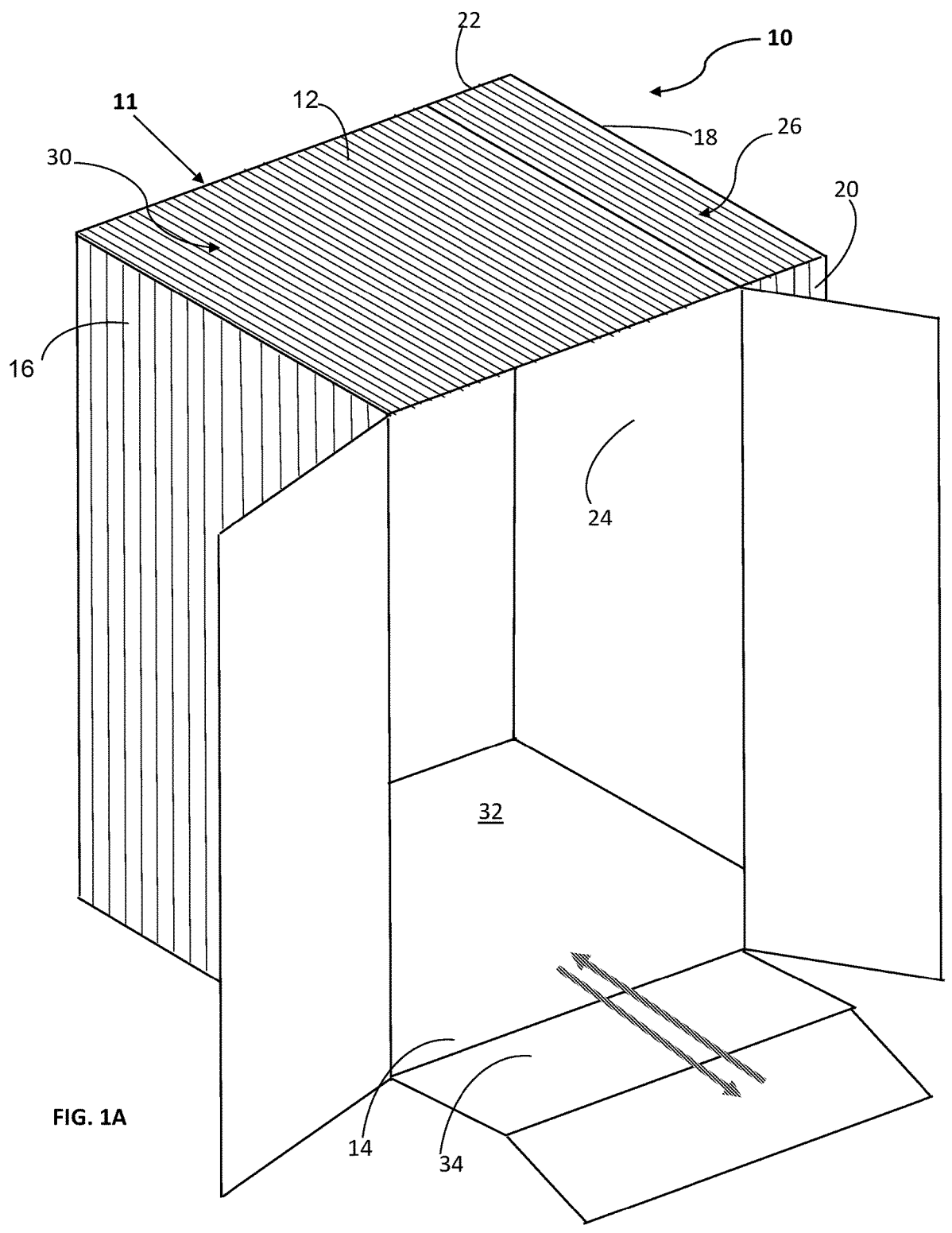
FIG. 1A illustrates an example of a typical cargo container that can be configured as a vehicle inspection station according to the invention, for inspecting a vehicle in its static position within an inner space of the container's compartment.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

FIG. 1A schematically illustrates an exemplary vehicle inspection station 10 implemented within a typical cargo container 11 shown in the figure in its open state. The cargo container 11 has a roof panel 12, a floor panel 14 and four side panels 16, 18, 20, 22. The container 11 is configured to define two adjacent compartments separated by a partitioning wall 24. A first compartment 26 is configured as a control room, and a second compartment 30 is configured as an inspection system as will be described further below. The second compartment 30 defines an interior space 32 enabling a vehicle entry therein (or passage therethrough as will be exemplified further below).

In the non-limiting example of FIG. 1A, the cargo container's configuration is aimed at inspecting a vehicle stationary located within the interior space 32 of the compartment 30, and thus the container 11 may be configured such that the compartment 30 may be opened at its one side 20 only. The cargo container 11 may include one or more vehicle loading/unloading ramps. In the specific example of FIG. 1A, intended for inspecting a vehicle stationary located within the interior space 32 of the compartment 30, only one ramp 34 may be provided serving as loading and unloading ramp to direct the vehicle into the space 32 from road level to the container level and back out of the space 32.

It should be understood that imaging-based inspection of vehicle moving (e.g. while driving) through an inspection region (within the interior space 32) defined by the inspection system might be preferable at least because noise reduction in signals being detected is easier to implement. On the other hand, in some cases depending on weather conditions or seasons, inspection of stationary located vehicles may be preferable.

It should be understood that the cargo container 11 exemplified in FIG. 1A may be configured enabling its opening at opposite side 22 as well, thus enabling a vehicle's movement out of the inspection region, after being inspected, via the opening in the side 22 (e.g. using an unloading ramp at said side) or enabling vehicle's inspection while moving through the space 32.

Figure 1B:
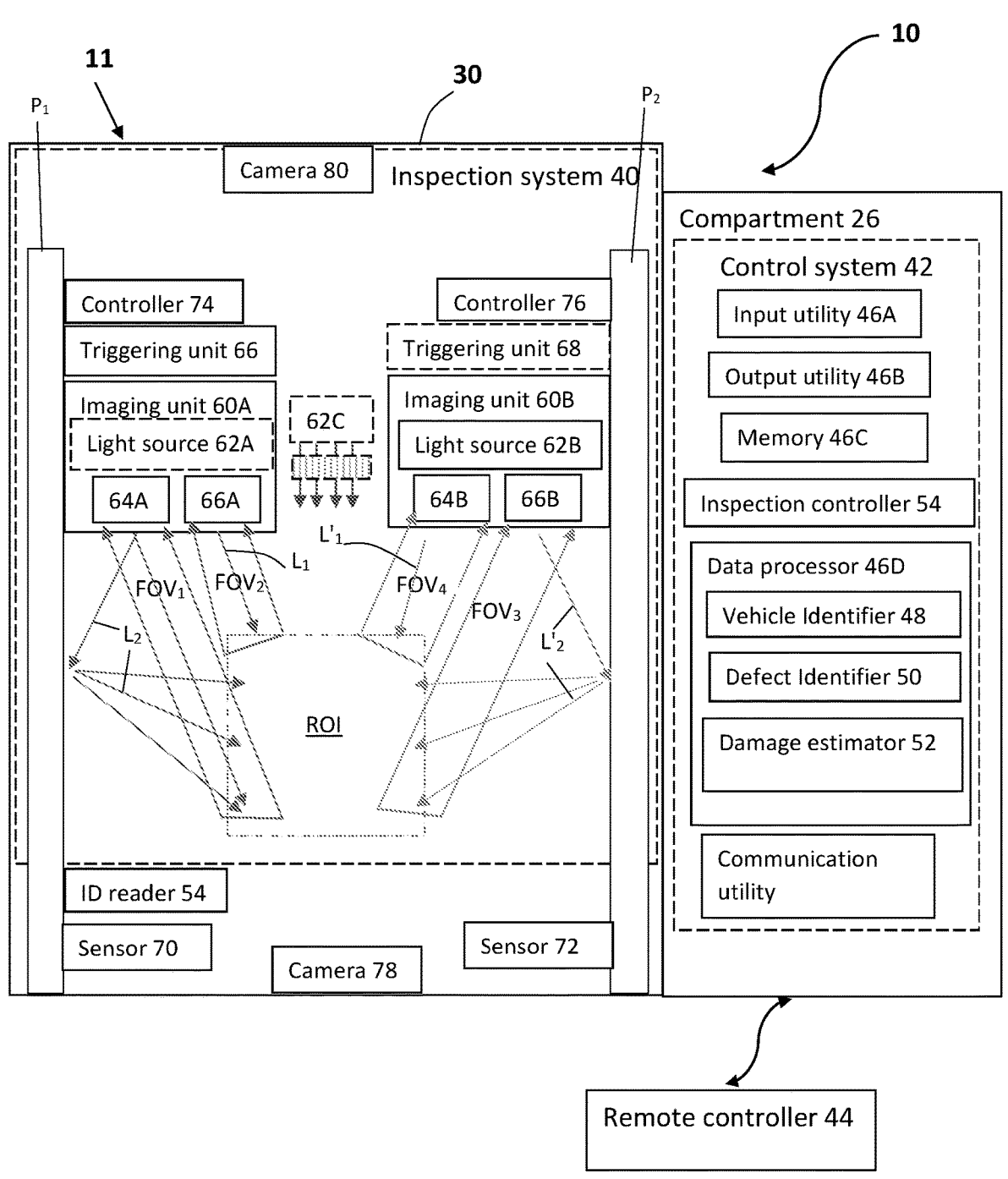
FIG. 1B exemplifies, by way of a block diagram, the configuration of the vehicle's inspection station of the invention.

Reference is now made to FIG. 1B showing, by way of a block diagram, the configuration and operation of the inspection station 10. The compartment 30 includes an inspection system 40 and the compartment 26 includes a control system 42. The inspection system 40 and the control system 42 are configured for signal/data communication between them via wires-based or wireless communication of any known suitable type. The control system 42 may be also configured for data communication with a remote controller 44 (cloud computer/server) via a communication network of any known suitable type. Such wireless communication techniques (communication utilities and communication protocols) do not form part of the present invention and are known per se and therefore need not be specifically described.

The control system 42 is typically a computer system including inter alia such main functional utilities as input utility 46A, output utility 46B, memory 46C, and data processor and analyzer 46D. The data processor 46D is configured according to the invention to be responsive to inspection data obtained by the inspection system 40 to analyze said data and generate corresponding data indicative of the vehicle's status. The data indicative of the vehicle's status may be vehicle's status data (i.e. data indicative of detected one or more defects and possible also corresponding damage-relating data) or may be pre-processed image data enabling extraction therefrom the vehicle's status data by further processing at a remote control station (cloud or remote server).

Thus, in some embodiments, the data processor 46D includes a defect identifier utility 50 configured and operable to process data obtained by the inspection system 40 and generate defect-related data being indicative of the vehicle's status/condition. The data processor 46D may also include a damage estimator utility 52 configured and operable to analyze the defect-related data to estimate corresponding damage and generate vehicle condition/status data. Alternatively, such damage estimator 52 and possibly also the defect identifier utility 50, may be located at the remote controller 44. Generally, the processing and analyzing of the inspection data may be performed by software utilities distributed between the control system 42 and remote controller at a cloud server 44.

The vehicle's status data is properly stored in the memory 46C and/or in a separate storage device/database (e.g. that of the cloud server 44). In some embodiments, as will be described further below, the control system 42 and/or that of the cloud server 44, performs the processing and analysis of the inspection data to generate corresponding vehicle's status data (using machine learning techniques), and generate the respective damage report. In case these functions are performed by the control system 42, it properly operates to communicate the vehicle's status data to the cloud server 44.

The data processor 46D may also include a vehicle identifier 48 which receives an ID of the vehicle being inspected and generates corresponding vehicle data to be associated with/assigned to the respective vehicle status data to be stored together. In some cases, the vehicle's controller may supply the vehicle's ID information to the control system. However, the vehicle's inspection system 40 may be adapted to obtain the vehicle's ID from information on the vehicle itself. This may be implemented by using an ID reader 54 accommodated in the compartment 30 and configured to properly detect the ID of the vehicle entering the space 32. Alternatively or additionally, the vehicle's ID can be detected by imaging unit(s) of the inspection system 40, as the case may be. Reading/identification of the vehicle arriving to the inspection system can be implemented using RFID reader or any other suitable wireless type detection of vehicle's identification data. Optionally, the imaging unit may be adapted to detect information on the vehicle's number plate, e.g. using optical character recognition (OCR) or any other known in the art technique.

The vehicle identifier 48 may utilize the received ID of the vehicle and pre-stored (reference) data (e.g. being accessed via communication with a respective database) including relevant information about the respective vehicle, e.g. historical data about previous inspection stages, to thereby generate the vehicle data. Alternatively, the vehicle identifier 48 may be configured to just associate the vehicle's ID with the defect-related data or vehicle's status data to be stored together and communicated to the remote controller 44.

The control system 42 may also include an inspection controller 54 configured and operable to operate the inspection system 40 by implementing one or more inspection modes during one or more inspection sessions, being selected as optimal inspection modes for the specific vehicle. The inspection mode(s) and a number of inspection sessions may be predefined based on user's input and/or vehicle type and/or historical data about earlier inspection stages of the specific vehicle. The inspection mode is characterized by one or more operational parameters/conditions of imaging scheme(s) to be applied to the vehicle, as will be described further below.

The inspection system 40 includes an imaging system which may include a desired number of imaging units enabling detection of various parts of the vehicle and apply imaging to each such part. In the non-limiting example of FIG. 1B, two such imaging units 60A and 60B are shown.

The elements of the imaging units may be mounted on opposite inner walls of the container to inspect a region of interest ROI (where the vehicle is located) at both sides, as well as may include elements installed on the ceiling and/or on the floor of the compartment 30 (for inspection of the bottom side of the vehicle).

As also exemplified in FIG. 1B, the container 11 (as well as the structure of deployable canopy-like or gate-like configuration) may include at least two capturing pillars $P_1$ and $P_2$, one from each side of the region of interest ROI, and the imaging units 60A and 60B can be mounted on these pillars, respectively. It should, however, be understood that the imaging units may be mounted on inner surfaces of the container's walls.

Each imaging unit includes at least one camera (pixel matrix), and preferably at least two cameras aimed to at least two respective fields of view (FOVs): imaging unit 60A includes cameras 64A and 66A having $FOV_1$ and $FOV_2$, and imaging unit 60B includes cameras 64B and 66B having $FOV_3$ and $FOV_4$. The fields of view $FOV_1$ and $FOV_3$, as well as fields of view $FOV_2$ and $FOV_4$ may be symmetrically identical. At least some of the fields of view may be at least partially overlapping. In particular, the fields of view $FOV_1$ and $FOV_2$ of cameras 64A and 66A may be partially overlapping between them, and similarly fields of view $FOV_3$ and $FOV_4$ of cameras 64B and 66B may be partially overlapping.

The inspection may utilize internal illumination of the space 32. For example, each imaging unit may include its light source, or a common light source may be used in imaging sessions performed by both imaging units. In the present non-limiting example, imaging unit 60A includes light source 62A and imaging unit 60B includes light source 62B. The light sources illuminate at least portions of the region of interest ROI and the cameras receive light returned from (reflected/scattered) from the illuminated portions, as schematically shown in the figures.

It should be understood the light source unit may only be associated with a specific camera, while not being part of the respective imaging unit (i.e. imaging unit containing said camera). To this end, light source unit 62A is shown in the figure in dashed line as being optionally a part of imaging unit 60A, while may or may not be associated with any specific camera(s). As also shown in the figure in dashed lines, in some embodiments, one or more light source units, generally at 62C, may be independently operable to provide illumination of the at least part of the region of interest being imaged by one or more cameras. In some other embodiments, the case may be such that general illumination of the inner space of the compartment is used (continuous illumination) that supports all the cameras (i.e. operates during imaging sessions of all the cameras).

As will be described further below, irrespective of whether the light source and camera forms a common imaging unit or not, the illumination and imaging sessions may be properly synchronized.

Also, as will be described further below, in some embodiments, specific illumination is used which is triggered with the camera simultaneously. For example, a laser grid of NIR illumination associated with the camera equipped with a proper NIR pass filter are used in order to detect some grid deformations as defects.

The cameras may be configured to operate (e.g. selectively) with various spectral characteristics of light being detected, i.e. may be color, monochrome or NIR/IR cameras. To this end, the cameras may be equipped with proper spectral filters. The cameras may be of the type having optic and/or digital zoom. The light source(s) may also be configured to generate (e.g. selectively) light having certain spectral characteristics, i.e. may be monochrome, color, or NIR/IR light, as well as may be configured to produce coherent illumination such as laser illumination.

Considering the configuration with capturing pillars $P_1$ and $P_2$ carrying the imaging units 60A and 60B, the element(s) of the light sources may be build-in the pillars.

Further, the inspection modes may utilize flash-type or continuous illumination during the inspection session. The spectral characteristics of illumination may be selected in accordance with the type of illumination and the type of inspection session. For example, if the inspection session is to be applied to a vehicle during its passage through the inspection region (region of interest) while being driven along the road, and applying of flash illumination is needed, the use of flash illumination of visual spectrum might need to be avoided and the use of NIR illumination is preferred.

In some cases it is preferred to use diffusive illumination. This can be implemented by appropriately configuring the light source unit to generate diffusive light and/or utilizing diffusive interior of the container, i.e. illuminating the region of interest by light scattered from diffusive inner surfaces of the container. This is exemplified in the figure: illuminating light components $L_1$ and $L_2$ are directly incident onto respective portions of the regions of interest and illuminating light components $L'_1$ and $L'_2$ are incident onto the region of interest after being scattered from the inner surfaces of the container.

It should be noted that the imaging units may be configured and operable (e.g. selectively operable) to implement 3D imaging of the vehicle's surface portions, e.g. in order to detect and analyze the surface topology (to detect the defective surface deformation). As schematically exemplified in FIG. 1B, in relation to light source 60C, this may be implemented by utilizing structured light illumination, or by utilizing projection of a certain pattern/grid, thus enabling identification of abnormal surface deformation via a change in the pattern features in the image.

Generally, the light source may utilize a projector, or Halogen source, or LED or laser. Also, the light source may include a diffractive optical element (DOE). The latter can be used in order to produce a predefined pattern of light emitted by a laser diode. More specifically, the laser diode illumination passes through the DOE and thus produces a light pattern having nominal focal point at any distance. This configuration provides for generating laser structured light that can be used to detect structural defects (via identification of the pattern deformations in the image data).

It should also be noted that the inspection technique may utilize the vehicle registration procedure to apply the inspection mode upon determining that the vehicle is properly located in the region of interest with respect to the imaging unit(s). The registration procedure may be implemented by determining a distance from the imaging unit to the vehicle using any known suitable type of proximity sensor(s), such as optical and/or acoustic (e.g. ultrasound) sensor(s). In the non-limiting example of FIG. 1B, two such sensors 70 and 72 of the same or different types are provided at the opposite inner surfaces of the container, e.g. on the opposite capturing pillars $P_1$ and $P_2$.

As further exemplified in the figure, the inspection system may utilize a triggering system configured and operable to activate the inspection session by generating triggering signals upon determining that the vehicle or specific portion thereof to be inspected has arrived at a target location (registration position)/has passed through the target location.

In the non-limiting example of FIG. 1B, such triggering system includes triggering units 66 and 68 at opposite sides of the region of interest, i.e. on the opposite inner surfaces of the container, e.g. on the capturing pillars $P_1$ and $P_2$.

The triggering unit may utilize an optical assembly of the kind measuring an object location with respect to a target (e.g. cross lines) being either physical or virtual target. Such triggering unit may utilize a light detection and ranging (LIDAR) device. Triggering unit(s) 66, 68 generate(s) triggering signal(s) upon determining that the vehicle has arrived at a certain position with respect to the target (registration position aligned with target or has passed through inspection region). Generally, triggering signals can be produced by LIDAR, ultrasound proximity sensor, distance measuring sensor, laser cross line sensor, piezo sensor (pressure sensor), sound microphone, microswitches, or any combination of two or more of such sensors.

Sensing data generated by proximity sensor(s) 70, 72 and/or triggering signals generated by triggering unit(s) 66, 68 can be received and processed by local controller(s) 74, 76 being computing units which generate(s) control signals either directly to the imaging units or via the inspection controller 54 of the control system 42 to properly operate the inspection mode/session.

As further shown in FIG. 1B, the inspection system may include additional one or more cameras located on the container ceiling (camera 80) and/or container's floor (camera 78).

The operation of the inspection station 10 will be exemplified more specifically further below with reference to FIG. 6.

Figure 2A:
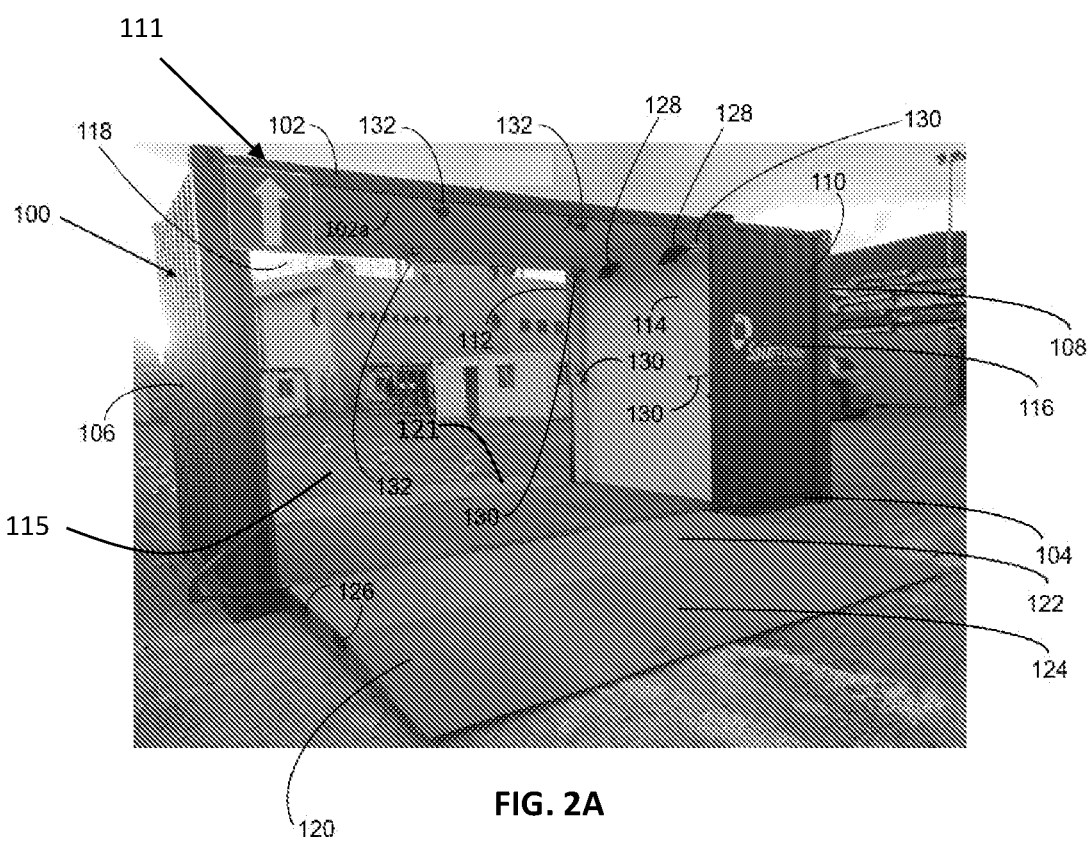
Figure 2B:
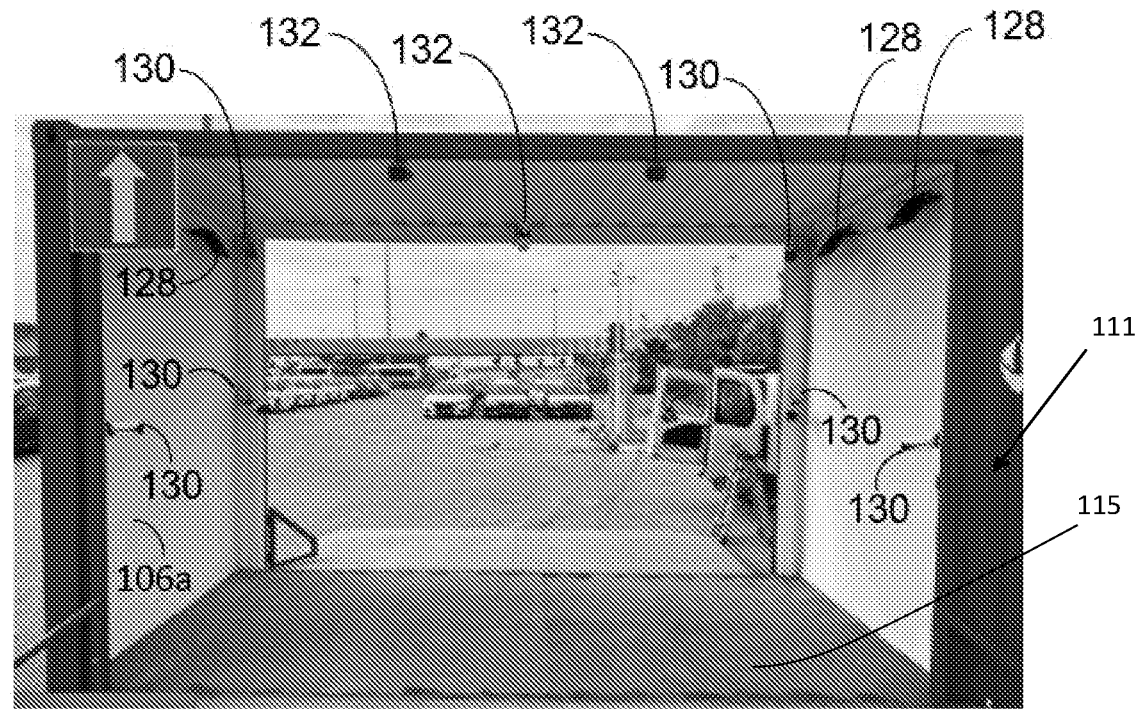
Figure 2C:
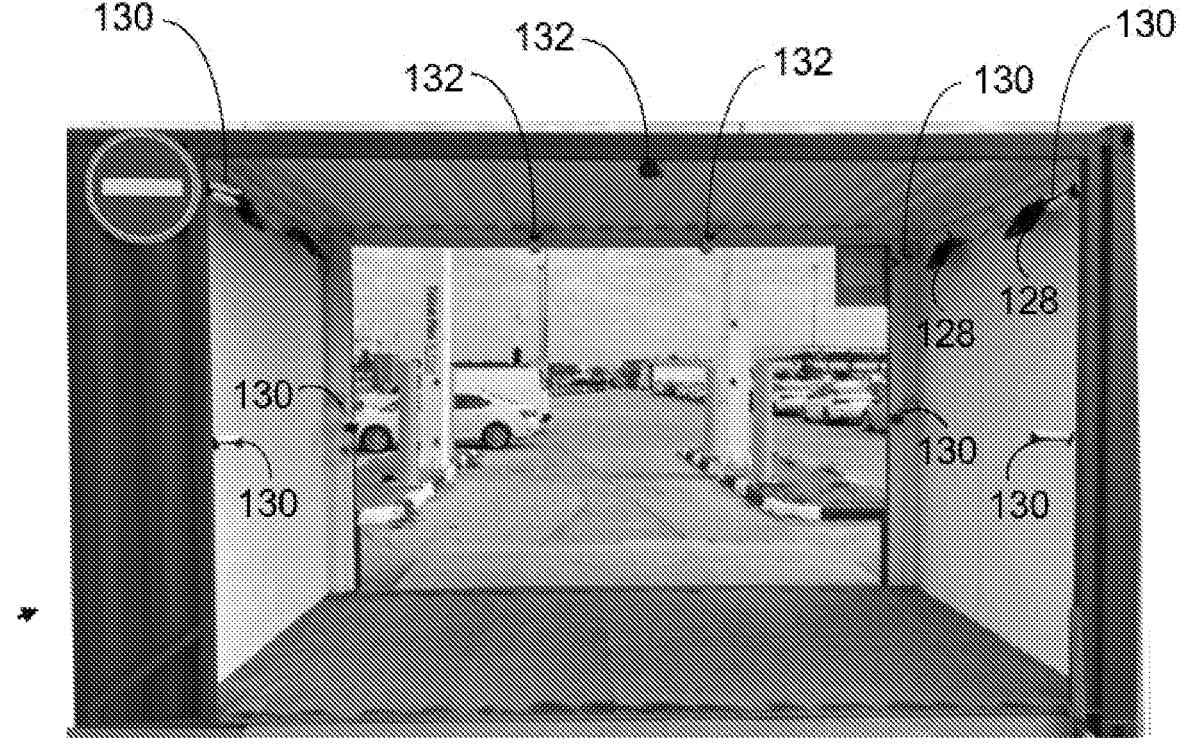

Reference is made to FIGS. 2A-2C, showing an exemplary inspection station 100 implemented by using a conventional cargo container 111 configured to enable its opening at opposite sides/facets thereof. This enables the vehicle entry into the inspection region from one side and exiting the inspection regions from the opposite side of the container, allowing the vehicle inspection either in static or moving state.

As described above, the cargo container configured as a vehicle inspection station can be brought to a desired location and used for inspecting a fleet of vehicles during a transportation stage, can be placed on a vehicle harbor, on a cargo ship, at car rental statins, cargo train platforms, car parks and the like. The cargo container may include an electricity generator.

The cargo container 111, which is shown in its open operative state, has a roof panel 102, a floor panel 104 and four side panels 106, 108, 110, 112, and is divided into two compartments, by a partitioning wall 114. First compartment 116 is configured as a control room (includes the above-described control system 42) and second compartment 115 defining an interior space 118 therein, is configured as the above-described inspection system 40.

The inspection station 100 includes a loading ramp 120 at the container's side 110 and an unloading ramp 121 at the opposite side 112 of the container). The loading/unloading ramp may be configured to define a deck portion 122 and a ramp portion 124, adapted to compensate for the height differences between the floor panel 104 and ground level of the surroundings of the cargo container 111, and thereby facilitate entry of vehicle into and out of the interior space 118 of the compartment 115. The deck portion 122 may optionally form a substantially uniform surface with the floor panel 104 while the ramp portion 124 may form an inclined plane, between the deck portion 122 and the surroundings.

Generally, the loading/unloading ramp 120, 121 (ramp 34 in FIG. 1A) can be detachably secured to the floor panel 104 of the container by any suitable connecting assembly known in the art, such as for example, a rest-on connection, a hook connection, a tube connection or a bottom hook connection.

In some cases, each loading ramp may further include a plurality of forklift pockets (pockets 126 in association with loading ramp 120 being exemplified in FIG. 2A) adapted to receive prongs of a forklift therein and thereby enable transportation thereof by the forklift. In other cases, the ramp may include other connection elements (e.g., weld on hooks/loops, shackles, wire rope slings, etc.) that enable secure connection to a transportation vehicle (e.g., to a truck crane via chains) and transportation thereof. The loading/unloading ramp is made of a suitable material that is capable of withstanding typical weight of a vehicle, an outdoor weather, etc.

The roof panel 102 (12 in FIG. 1A) may include a canopy addition. The roof panel, with or without the canopy addition, may include upper connection elements/assemblies (e.g., weld on hooks/loops, shackles, wire rope slings, etc.) that enable secure connection of the cargo container 111 to container lifting equipment (e.g., gantry cranes, straddle carriers, reach stackers, top loaders, truck cranes, etc.) in order to transport the cargo container based inspection station 100 to a desired location. In some cases, such upper connection assembly/ies may be located at any desired location on the roof panel, and/or the floor panel and/or the four side panels.

Figure 3:
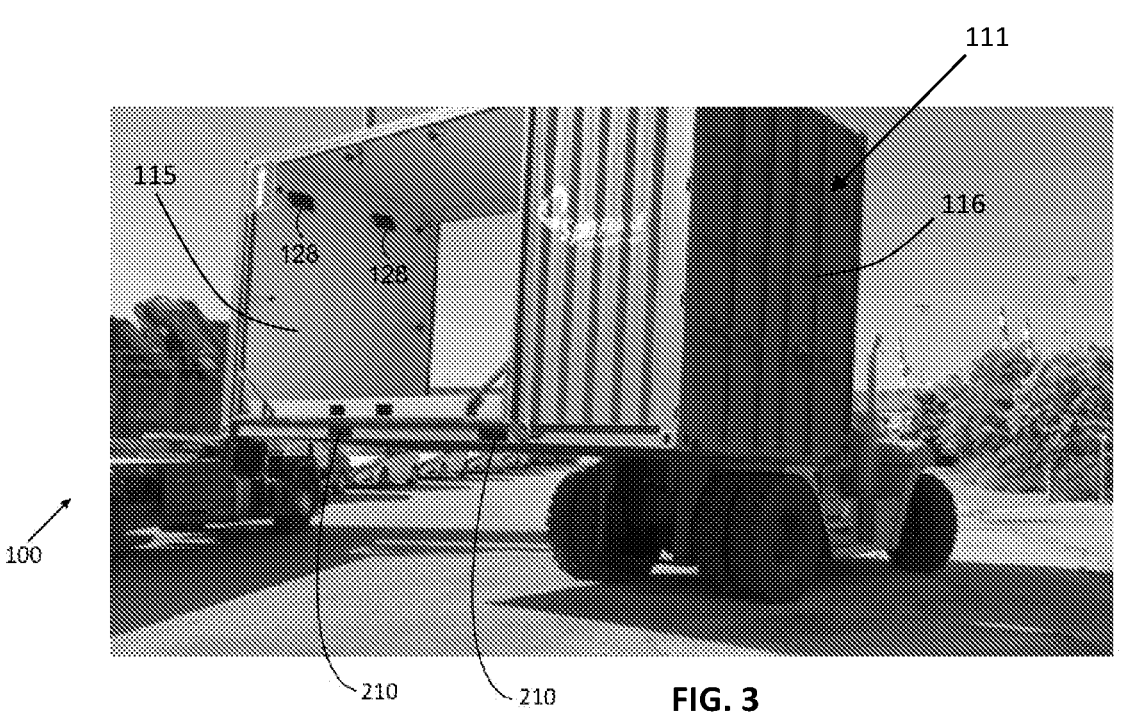
FIG. 3 exemplifies the cargo container configured as the vehicle's inspection station while being lifted by a forklift.

FIG. 3 exemplifies the cargo container 111 being lifted by a forklift. As shown in the figure, the floor panel 104 may include a plurality of forklift pockets 210 adapted to receive prongs of a forklift therein and thereby enable transportation of the cargo container 111 by the forklift to a desired location.

The inspection system incorporated in the compartment 115 is configured generally similar to the above-described system 40. Referring back to FIGS. 2A-2C, it is shown that the compartment 115 includes one or more light source units 128 configured to illuminate the interior space 118.

As described above with reference to FIG. 1B, the operational conditions of the light sources 128 can be configured to provide various illumination conditions. These may include but not limited to, continuous illumination with constant or varying illumination and light propagation conditions, pulsed illumination, or a combination of these types of illumination during the inspection session(s), and/or specific spectral characteristics being either maintained or varied during inspection sessions, and/or projection of a predetermined light pattern, a flashing light with a predetermined frequency (for example and without limitation, a high flashing frequency may be used for emergency cases, e.g. an accident, whereas a low flashing frequency may be used for routine cases, e.g. a vehicle is approaching the interior space 118), and/or combination(s) thereof where applicable.

The light sources 128 may be mounted on the partitioning wall 114 and/or on the side panel 106, as can be seen in FIGS. 2A-2C and 3. Alternatively, or additionally, the light sources 128 may be mounted on a first side 102a of the roof panel 102, that is facing the interior space 118, and/or recessed in the floor panel 104. It is to be noted that in other cases, the light sources 128 may be located at any desired location on the roof panel 102, the floor panel 104, the four side panels 106, 108, 110, 112 and the partitioning wall 114. As described above, the illumination can be pointing directly onto the vehicle (or vehicle's portion) or using the container\canopy inner surface(s) as diffusive reflector(s).

The second compartment 115 further includes one or more cameras 130, configured to acquire one or more images and/or video recordings of a vehicle located in/passing through the inspection region within space 118. As described above with reference to FIG. 1 the camera(s) 130 can be operable in visible as well other optical spectra (IR and/or NIR), to generate image data (one or more images and/or video recordings).

It should be noted that the inspection system may also be adapted to perform imaging using X-ray or Gamma-ray radiation and/or multi spectral illumination. This might be needed to additionally inspect the interior of the vehicle and/or material/coating on the vehicle's exterior.

Generally, camera(s) may be sensitive to the entire visible spectrum (e.g., a commercial-off-the-shelf camera, such as a DSLR camera, an IP camera, a webcam camera), multispectral camera or only to a part of it. In some cases, the camera(s) can be depth camera, capable of generating a 3D representation of the vehicle located in/passing through the inspection region.

As also shown schematically in FIGS. 2A-2C and 3, the cameras 130 may be oriented at different angles with respect to the interior space 118 of the compartment 115, to capture images and/or video recordings of a vehicle from respective angles (e.g., each camera 130 may be associated with a respective capturing angle), wherein some cameras can be oriented outwardly from the interior space 118, e.g., towards the entrance or the exit of the cargo container 111 (e.g., cameras denoted 132 and best seen in FIGS. 2A-2C), to capture images and/or video recordings of vehicles approaching and/or exiting the cargo container 111.

In order to capture said images and/or video recordings, cameras 130, 132 may be mounted on the first side 102a of the roof panel 102, the floor panel 104, the partitioning wall 114 and/or a first side 106a of the side panel 106, and oriented towards respective capturing angle.

As described above with reference FIG. 1B, the control room compartment 26, 116 is configured to accommodate the control system 42 which may include one or more computing devices having data processing capabilities. For example and without limitation, this may include a server, a personal computer (PC), a tablet PC, a set-top box (STB), a Personal Digital Assistant (PDA), a cellular telephone, a web appliance or any other computing device capable of executing a set of instructions (sequential or otherwise) that specify actions to be taken by control system. The computing device(s) is/are configured to communicate (e.g., via a communication network), inter alia, with the cameras, by means of wired or wireless communication and exchange data therewith. The communication network may be for example and without limitation, a cellular network, a Personal Area Network (PAN) Local Area Network (LAN), a Wireless Local Area Network (WLAN), a Metropolitan Area Network (MAN), Wide Area Network (WAN), Virtual Private Network (VPN), an intranet, an extranet or an Internet.

The control system can further comprise or be in communication with a data repository (for example and without limitation, a database, a storage system, a memory including Read Only Memory—ROM, Random Access Memory—RAM, or any other type of memory) configured to store data, optionally including, inter alia, data related to vehicles entering/passing through the inspection system within the compartment of cargo container and/or images and/or video recordings thereof captured by the cameras.

Figure 4:
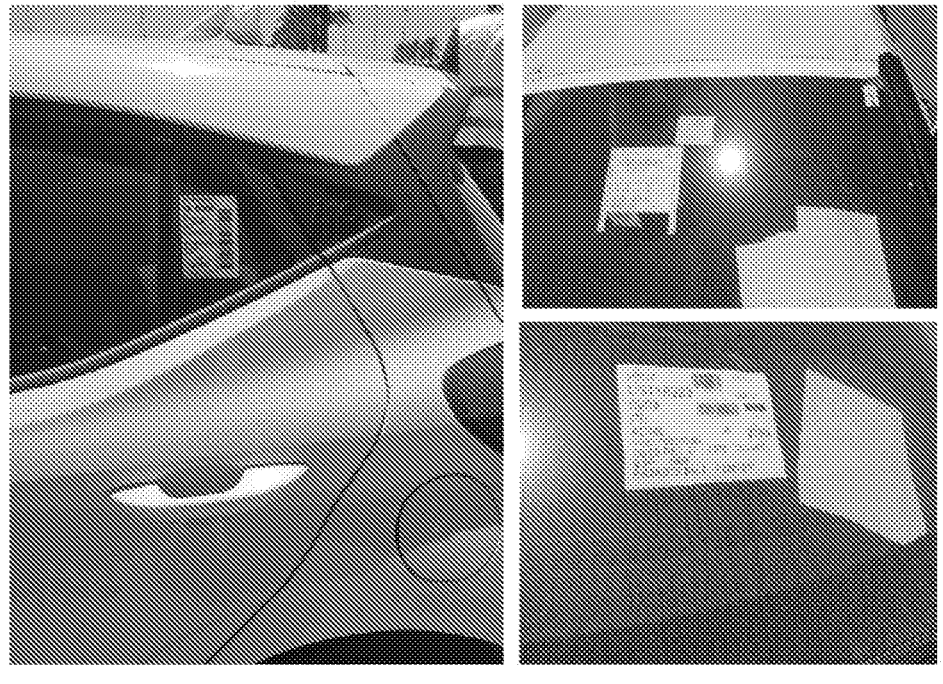
FIG. 4 exemplifies vehicle's ID information presented on the vehicle enabling the vehicle's identification.

New vehicles that arrive to a seaport (e.g., for exportation) typically do not have a unique identifier such as for example a license plate. Therefore, these vehicles are to be identified, inspected and registered. For this purpose, the control system (e.g. its inspection controller 54) can be further configured to operate the cameras of the inspection system (e.g., turn on/off a respective camera, rotate a respective camera to capture additional/another angle, change focus, etc.). The cameras can be operated for example to identify features on each vehicle entering the inspection station compartment (e.g., a barcode, one or more stickers, numbers, etc.), as described above and as can be seen in FIG. 4, and thereby registering each vehicle accordingly.

Figure 5:
FIG. 5 illustrates an example of a damage that can be identified by the vehicle's inspection system of the invention.

As also described above, the control system can be configured to analyze the acquired images and/or video recordings of each vehicle in order to, for example, detect damages thereon such as for example, scuffs, scratched, dents, structural damages, weather damages, etc. An exemplary damage that can be identified by the inspection system is illustrated in FIG. 5.

Also, it should be noted that the camera(s) of the inspection system can be configured to capture high traffic of vehicles passing through the inspection station of the cargo container for example 250 vehicles per hour, wherein each vehicle is traveling at speed of up to 30 kilometers per hour.

In some cases, the control system 42 may be responsive to user input in order to operate one or more devices of the inspection system to execute the desired inspection mode(s). Preferably, the inspection system can operate almost or fully automatically (without a manual intervention) in accordance with the predefined inspection plans.

It should be noted, although not specifically illustrated, that the control room compartment 26, 116 may further include a generator that is configured to provide power to various devices of the inspection system thereby enabling the inspection system within the cargo container to operate as an autonomous unit that does not depend on an external power source or weather conditions.

As described above and illustrated in the figure, in case the support structure of the inspection station is in the form of a cargo container, at least one of the side walls of the container is configured as a door shiftable from its normally closed position to the open position, in order to allow entrance of a vehicle into the respective compartment of the container. For example, said at least one of side wall may be hingedly connected to the cargo container body.

Figure 6:
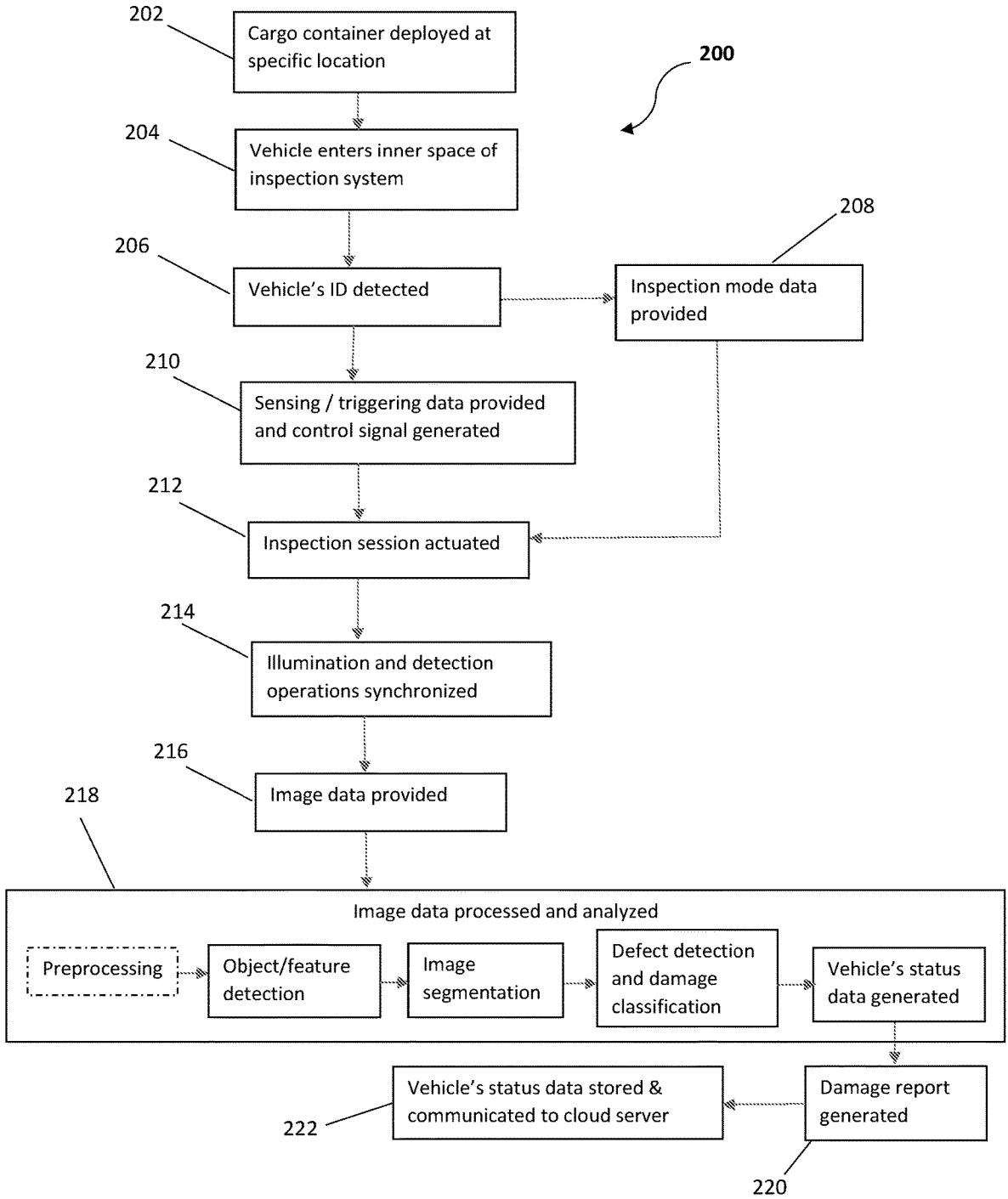
FIG. 6 is a flow diagram exemplifying the method of operation of the vehicle's inspection system of the present invention.

Reference is made to FIG. 6 exemplifying a flow diagram 200 of the operation of the inspection station of the present invention. The cargo container carrying the inspection station is provided (deployed) at a specific location (step 202). A vehicle to be inspected enters the inspection region (inner space of the respective compartment of the container)—step 204. Vehicle's ID can be detected (if not provided by any other means)—step 206. The vehicle's ID may be communicated to the vehicle identifier utility 48 of the control system 42 in order to enable selection and assignment of the optimal inspection mode for the specific vehicle (step 208).

Then, the above-described vehicle's position registration and triggering procedures are performed to generate control signal (step 210). This may be implemented as follows:

The target (physical or virtual target e.g. in the form of a cross-line) is reached (interrupted in case of physical target) and/or distance measurement procedure is performed based on proximity sensor(s). Alternatively or additionally, a motion detection element may be used to trigger the camera to perform preliminary imaging and this image data is processed to perform object detection and/or motion detection. More specifically, in order to start the inspection session or start triggering of the cameras, a preliminary imaging may be performed by a camera to provide a video stream which can be analyzed in order to detect motion at a certain position and/or a displacement at a predefined virtual crossline. Also, object detection may be used, e.g. real time vehicle detection.

Any of the above-described triggering techniques, as well as any combination of two or more of such techniques, can be used to activate/initiate the inspection procedure/session(s).

The control signal activates the vehicle inspection procedure (step 212) e.g. based on the specific inspection mode data provided by the inspection controller in step 208. To this end, each camera is preferably triggered/activated independently in order to acquire images of a specific vehicle part. The inspection controller of the control system (or the local controller(s) of the inspection system, as the case may be) operates the imaging units to synchronize the camera and light source operation (step 214).

As described above the illumination may be continuous, flash illumination, pulsed illumination or may utilize projection of a specific pattern. In case of non-continuous illumination mode, the illumination can be turned on in response to a triggering signal, and after image acquisition during a certain predefined time interval, the illumination is turned off. The case may be such that, depending on the camera being used, at any vehicle position several images are acquired by the camera while under different spectral characteristics of the illumination.

Image data collected during the inspection session is provided (step 216) and each image is communicated to the control system where the image data is processed and analyzed (step 218). The processing and analyzing of the image data may be executed as follows: Optionally but in some embodiments preferably, pre-processing is performed which may include illumination enhancement and/or image normalization and/or mean and standard deviation based normalization as known in the art. Then the image data (e.g. resulting from preprocessing) undergoes feature detection processing (e.g. by pattern recognition) to detect such objects/features of the vehicle as wheels, doors, windows, roof, front, back, etc. Typically, image segmentation processing can be applied to the images of these parts. Then, the resulting image data is analyzed by machine learning algorithms to detect defects and classify/evaluate corresponding damages, and generate respective vehicle's status data. This vehicle's status data can then be used to generate a damage report (step 220), and is also stored and communicated to the cloud server 44 (step 222).

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. An automatic inspection station for inspecting exterior of vehicles, the inspection station comprising:

a physical structure configured to be deployable at a predetermined location and, when deployed defining at least first and second adjacent compartments and exposing an inner space of the first compartment to vehicle's entry and exit into and from said inner space and at least partially isolate said inner space from ambient light, said first compartment comprising an inspection system, and said second compartment comprising a control system in data communication with the inspection system, said inspection system comprising an optical imaging system configured and operable for imaging a vehicle located within at least part of said inner space and generating image data, said control system being configured and operable to process the image data and generate data indicative of vehicle's status, wherein the control system comprises an inspection controller configured and operable to operate the inspection system to implement one or more selected inspection modes during one or more inspection sessions, said one or more inspection modes being selected in accordance with a specific vehicle to be inspected.

2. The inspection station according to claim 1, wherein said physical structure has one of the following configurations:

said physical structure defines the vehicle's entry and exit at one side of inner space; and said physical structure defines the vehicle's entry and exit at opposite sides, respectively, of said inner space, thereby enabling inspection of the vehicle while being stationary located within said inner space and enabling inspection of the vehicle while passing through said inner space.

3. The inspection station according to claim 1, wherein said physical structure has at least one of the following configurations:

said physical structure is configured as a mobile structure; and said physical structure is configured as a canopy or tent.

4. The inspection system according to claim 1, wherein said physical structure is configured as a mobile structure of a cargo container.

5. The inspection station according to claim 4, characterized by at least one of the following:

at least one of facets of said cargo container is configured as a door, which when being shifted to its open position, exposes the inner space of the first compartment of the container to the vehicle's entry and exit;

opposite facets of the cargo container are configured as opposite doors, which when being shifted to their open positions, expose the inner space of said first compartment to vehicle's entry and exit respectively; and said optical imaging system comprises at least one light source configured to illuminate at least said part of the inner space, and two or more cameras defining two or more fields of view to collect illuminating light returned from said illuminated at least part of the inner space.

6. The inspection station according to claim 4, further comprising at least one ramp configured to be removably attached to respective at least one facet of the container to enable entry of the vehicle from road to said inner space at container level and exit of the vehicle from the inner space.

7. The inspection station according to claim 1, wherein said optical imaging system comprises:

at least one light source configured to illuminate at least said part of the inner space, and two or more cameras defining two or more fields of view to collect illuminating light returned from said illuminated at least part of the inner space, said optical imaging system being characterized by at least one of the following:

the fields of view of at least some cameras being partially overlapping;

the optical imaging system comprises first and second imaging units comprising first and second cameras configured to collect illuminating light returned from first and second regions of the illuminated at least part of the inner space;

at least one of the light sources is configured and operable with one or more of the following spectral characteristics: colored, monochrome, NIR, IR;

at least one of the light sources is configured to produce coherent illumination;

at least one of the light sources produces diffusive illumination; and at least one of the light sources directs light onto diffusive inner surfaces of said physical structure such that said at least part of the inner space is illuminated by light scattered from said diffusive inner surfaces.

8. The inspection station according to claim 7, wherein at least one of said cameras is configured and operable with one or more of the following spectral characteristics: colored, monochrome, NIR, IR.

9. The inspection station according to claim 7 characterized by at least one of the following:

the at least one of the light sources is configured to illuminate said at least part of the inner space by structured light thereby enabling 3D imaging of an illuminated portion of the vehicle's exterior; and the at least one of the light sources is configured and operable to project on said at least part of the inner space a predetermined pattern, thereby enabling to identify changes in topology of a portion of the vehicle's exterior being imaged.

10. The inspection station according to claim 1, characterized by at least one of the following:

further comprises at least one sensor configured and operable to detect vehicle's identification data provided on the vehicle entering said inner space, and communicate said identification data to the control system in association with the image data of said vehicle;

further comprises one or more sensors configured and operable to provide sensing data indicative of the vehicle's position within said inner space to thereby enable activation of an inspection session upon identifying, based on said sensing data that the vehicle entering said inner space is in a registration position with respect to said optical imaging system; and said optical imaging system is configured and operable to detect vehicle's identification data provided on the vehicle being imaged and communicate said identification data to the control system in association with the image data of said vehicle.

11. The inspection station according to claim 1, wherein said inspection system further comprises one or more sensors configured and operable to provide sensing data indicative of the vehicle's position within said inner space to thereby enable activation of an inspection session upon identifying, based on said sensing data that the vehicle entering said inner space is in a registration position with respect to said optical imaging system, said one or more sensors comprising at least one proximity sensor.

12. The inspection station according to claim 1, wherein said inspection system further comprises one or more sensors configured and operable to provide sensing data indicative of the vehicle's position within said inner space to thereby enable activation of an inspection session upon identifying, based on said sensing data that the vehicle entering said inner space is in a registration position with respect to said optical imaging system, said one or more sensors comprising at least one of the following: at least one proximity sensor; and an optical system utilizing a physical or virtual target.

13. The inspection station according to claim 1, wherein the inspection system comprises a triggering system configured and operable to activate an inspection session by generating a triggering signal upon determining that at least a certain portion of the vehicle has arrived at a target location, defined by a physical or virtual target.

14. The inspection station according to claim 13, wherein the triggering system is characterized by at least one of the following:

the triggering system comprises one or more from the following sensors: LIDAR, ultrasound proximity sensor, distance measuring sensor, laser cross line sensor, pressure sensor, sound microphone, microswitch; and the triggering system comprises a camera operable to provide video data enabling at least one of motion detection and object detection from said video data, thereby enabling said determining of a location of the at least certain portion of the vehicle.

15. The inspection station according to claim 1, wherein said control system is characterized by at least one of the following:

the control system is configured and operable for data communication with a cloud server;

the control system comprises a data processor and analyzer comprising a defect identifier configured and operable to process the image data and generate defect-related data being indicative of the vehicle's status;

the control system is configured and operable to generate and store a report about the vehicle's status; and the control system is configured and operable to process the image data by carrying out the following: identify in the image data various features of the vehicle, apply segmentation processing to image data corresponding to one or more of the features, and analyzing segmentation processing results by machine learning and, upon identifying a defect in the feature evaluating a corresponding damage, and generating the data indicative of the vehicle's status.

16. The inspection station according to claim 1, wherein said control system comprises a data processor and analyzer comprising a defect identifier configured and operable to process the image data and generate defect-related data being indicative of the vehicle's status, said data processor and analyzer further comprising a damage estimator utility configured and operable to analyze the defect-related data to estimate corresponding damage being indicative of the vehicle's status.

17. The inspection station according to claim 1, wherein said control system comprises a data processor and analyzer comprising a defect identifier configured and operable to process the image data and generate defect-related data being indicative of the vehicle's status, said control system being configured and operable to communicate said defect-related data to a cloud server to enable further analysis of the defect-related data to estimate corresponding damage being indicative of the vehicle's status.

18. The inspection station according to claim 1, comprising a vehicle identifier configured and operable to identify the vehicle arriving to the inspection system and generating corresponding vehicle data to be assigned to the data indicative of the respective vehicle's status.

19. A method for automatic inspection of vehicles, the method comprising:

providing the automatic inspection station of claim 1;

providing, at a vehicle location, the physical structure in its deployed position defining said first and second adjacent compartment;

identifying the vehicle entering said inner space and generating vehicle relating data;

upon identifying, by said inspection system that the vehicle is located in a registered position in said inner space, activating an imaging system of said inspection system to perform one or more imaging sessions on at least selected parts of said vehicle, by implementing one or more selected inspection modes being selected in accordance with a specific vehicle to be inspected, and generating image data indicative thereof; and processing and analyzing the image data to detect defects in vehicle's exterior, classify damage, and generate corresponding vehicle's statis data.

20. An automatic inspection station for inspecting exterior of vehicles, the inspection station comprising:

a physical structure configured to be deployable at a predetermined location and, when deployed defining at least first and second adjacent compartments and exposing an inner space of the first compartment to vehicle's entry and exit into and from said inner space and at least partially isolate said inner space from ambient light, said first compartment comprising an inspection system, and said second compartment comprising a control system in data communication with the inspection system, said inspection system comprising an optical imaging system configured and operable for imaging a vehicle located within at least part of said inner space and generating image data, said control system being configured and operable to process the image data and generate data indicative of vehicle's status, wherein the inspection system comprises a triggering system configured and operable to activate an inspection session by generating a triggering signal upon determining that at least a certain portion of the vehicle has arrived at a target location, defined by a physical or virtual target.

21. The inspection station according to claim 20, wherein the control system comprises an inspection controller configured and operable to operate the inspection system to implement one or more selected inspection modes during one or more inspection sessions, said one or more inspection modes being selected in accordance with a specific vehicle to be inspected.

22. The inspection station according to claim 20, wherein the triggering system is characterized by at least one of the following:

the triggering system comprises one or more from the following sensors: LIDAR, ultrasound proximity sensor, distance measuring sensor, laser cross line sensor, pressure sensor, sound microphone, microswitch; and the triggering system comprises a camera operable to provide video data enabling at least one of motion detection and object detection from said video data, thereby enabling said determining of a location of the at least certain portion of the vehicle.

23. The inspection station according to claim 20, comprising a vehicle identifier configured and operable to identify the vehicle arriving to the inspection system and generating corresponding vehicle data to be assigned to the data indicative of the respective vehicle's status.

24. The inspection station according to claim 4, wherein said cargo container is divided by a partitioning wall into said first compartment and the second compartment, and is configured such that, when being deployed, the first compartment is opened at least at one side thereof providing that the inner space of the first compartment is exposed to vehicle's entry and exit into and from said inner space, and the second compartment is configured as a control room compartment adjacent to the first compartment.

25. The inspection station according to claim 4, wherein said control system comprises a generator configured to provide power to various devices of the inspection system thereby enabling the inspection station within the cargo container to operate as an autonomous unit substantially independent on an external power source or weather conditions.

\* \* \* \* \*